Dec. 9, 1958   G. RUNKEN   2,863,400
VEHICLE LATERAL MOTION CONTROL
Filed June 21, 1955   4 Sheets-Sheet 1
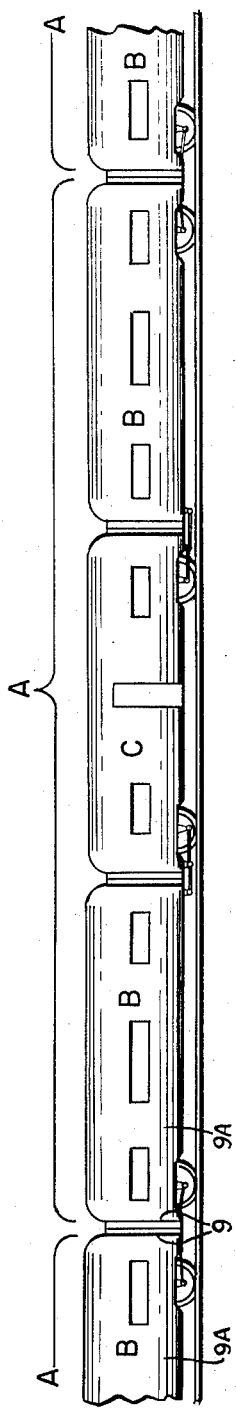
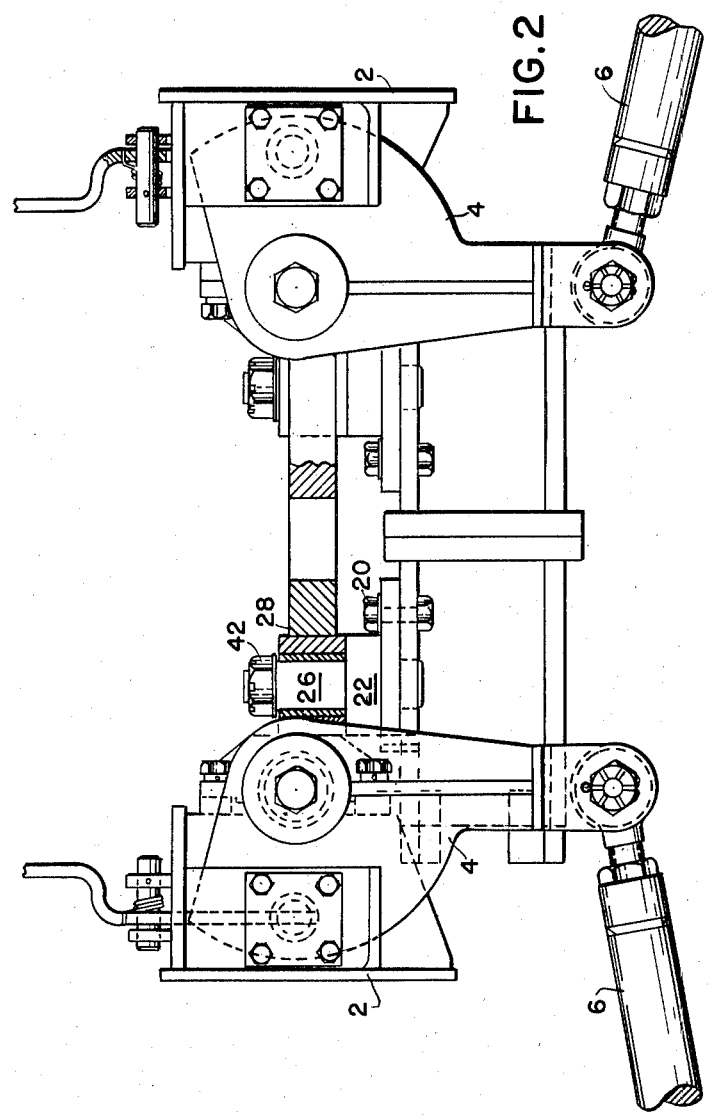
INVENTOR.
Gerd Runken
BY
ATTORNEYS

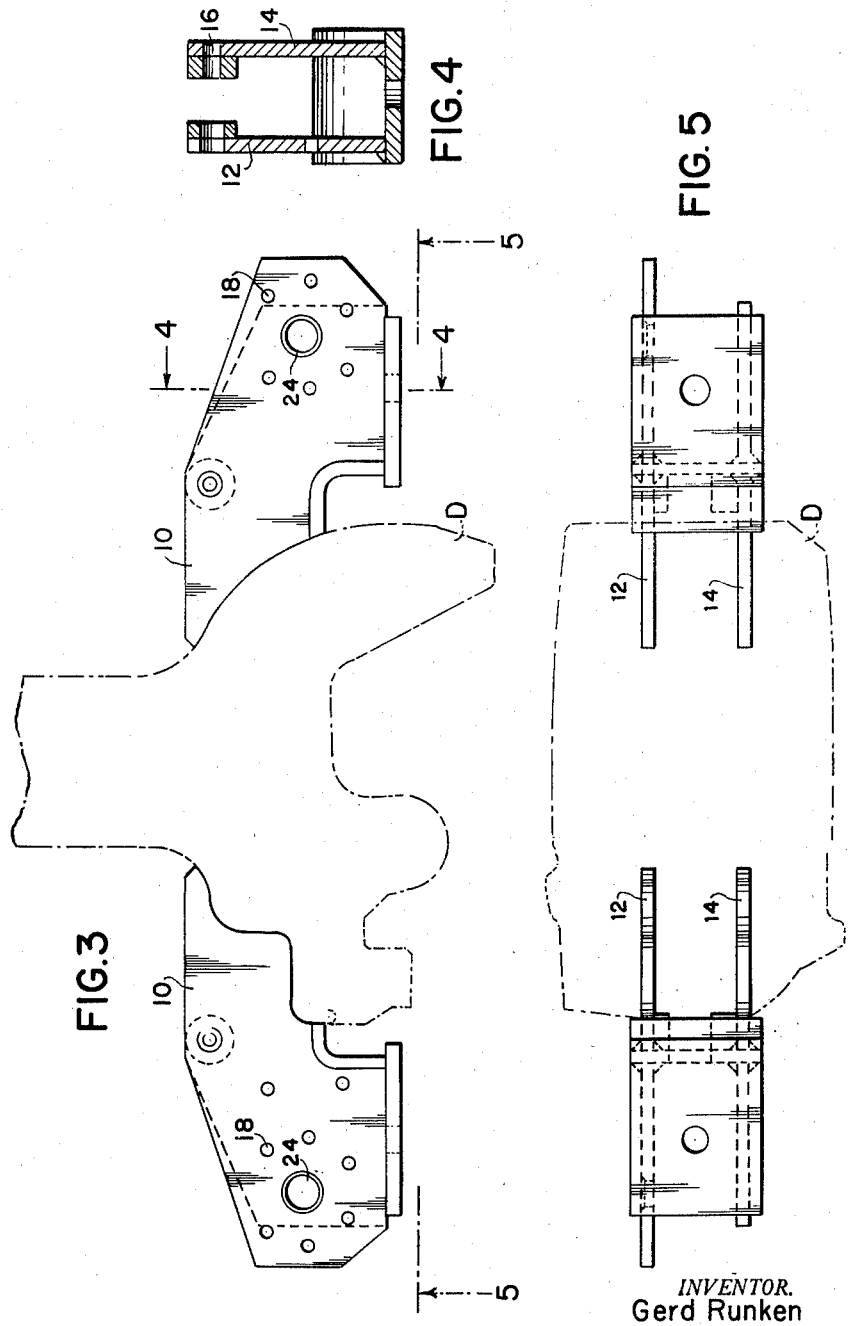

Dec. 9, 1958 G. RUNKEN 2,863,400
VEHICLE LATERAL MOTION CONTROL
Filed June 21, 1955 4 Sheets-Sheet 3

INVENTOR.
Gerd Runken
BY
*Hart, Shield + Price*
ATTORNEYS

Dec. 9, 1958 G. RUNKEN 2,863,400
VEHICLE LATERAL MOTION CONTROL
Filed June 21, 1955 4 Sheets-Sheet 4
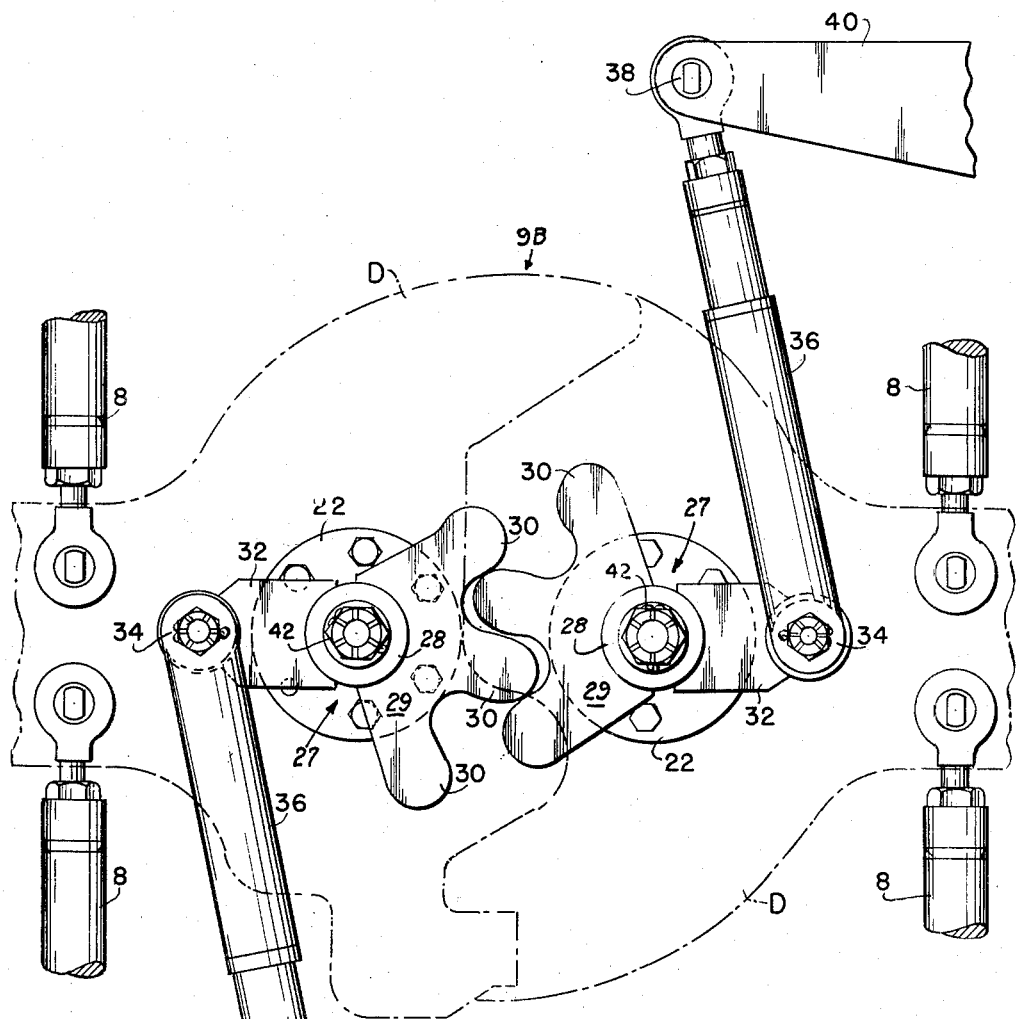
FIG.7
INVENTOR.
Gerd Runken
BY
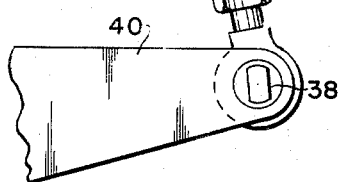
ATTORNEYS

United States Patent Office 2,863,400
Patented Dec. 9, 1958

2,863,400

VEHICLE LATERAL MOTION CONTROL

Gerd Runken, Cold Spring, N. Y., assignor to ACF Industries, Incorporated, New York, N. Y., a corporation of New Jersey Application June 21, 1955, Serial No. 516,950

6 Claims. (Cl. 105—3)

This invention relates to railway trains in general and particularly to lateral motion controls between cars of the train. In railway passenger trains, it is necessary that passengers move from car to car and in the past no provision has been made to give complete safety at the joint between the cars. In true articulated cars having the support and swivel at the joint lateral motion does not exist and a relatively safe passageway is provided. However, no provision has been made for a safe passageway where the cars are supported on trucks or wheels located inwardly of the car end. It is an object, therefore, of the present invention to provide cars with lateral motion control whereby a safe passageway is provided between cars.

A further object of the invention is the provision of a car adapted to be coupled in train with other similar cars and having lateral motion control devices carried by the cars.

A still further object of the invention is the provision of railway cars having mating couplers carrying mating lateral motion control means preventing relative lateral motion between the cars while permitting vertical, longitudinal and turning movements.

These and other objects of the invention will be apparent to persons skilled in the art from a study of the following description and accompanying drawings, in which:

Fig. 1 is an elevational view of a part of a train.

Fig. 2 is an enlarged detail view showing portions of the car end and the interrelated coupler and lateral motion controls.

Fig. 3 is a plan view showing the coupler modification to carry the lateral motion controls.

Fig. 4 is a sectional view taken substantially on line 4—4 of Fig. 3.

Fig. 5 is an end view looking in the direction of the arrows of Fig. 3.

Fig. 7 is a plan view showing a slight modification.

Figure 6:
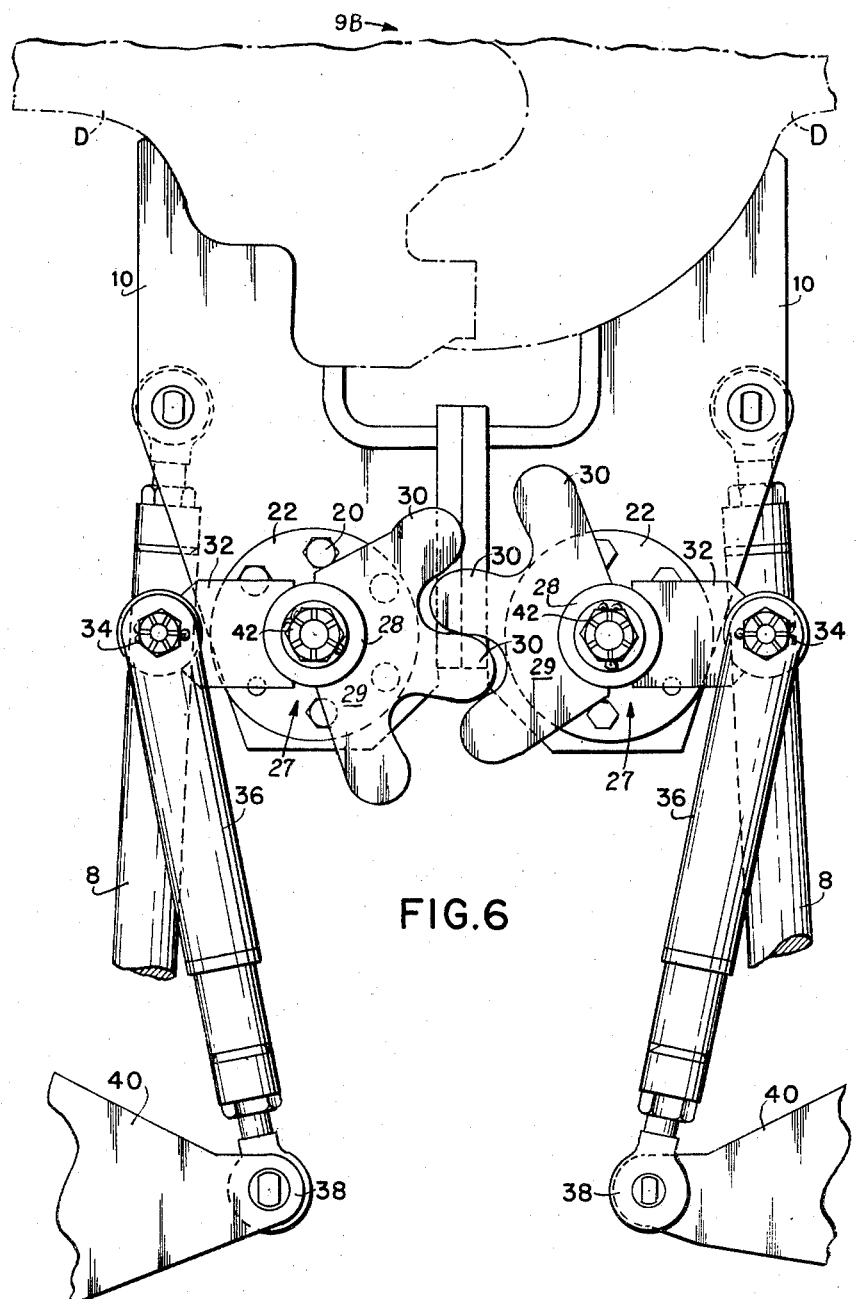
Fig. 6 is a plan view showing the interrelated couplers and lateral motion control.

Referring now to the drawings in detail the cars A are preferably made up of three units, that is, two end units B carried at their outer ends by wheels W and at their inner ends being supported upon a central unit C having its ends supported on wheels. The car interior may have a general interior appearance similar to that shown in Patent 2,650,547, that is, it will preferably have a low floor with passageway maintained between the wheels and at a level below the tops of the wheels. However, such an arrangement is not necessary for the operation of the lateral controls.

As shown in Fig. 2, brackets 2 are attached to the end walls 9 of the car body 9A and form pivotal mounts for bell cranks 4 connected by links 6 to the wheel and axle assemblies to control the same. Motion of the bell cranks is controlled by means of links 8 (Figs. 6 and 7) which are pivotally connected at their inner ends to the coupler D. The operation of this mechanism is fully explained in co-pending application Serial No. 507,618, filed May 11, 1955.

The couplers D, as shown, are of the tight-lock type having their inner ends pivotally connected to the cars and forming, when coupled, a bar 9B joining the cars A. Due to the location of the wheels inwardly of the car ends and the spring mounting of the cars on the wheels, the car ends will move vertically relative to each other and normally would move laterally with respect to each other due to lateral thrust. In order to eliminate the relative lateral motion between the adjacent ends of cars A each coupler of units B is provided, as shown in Figs. 3 to 6 inclusive, with brackets 10 welded or otherwise secured to opposite sides of the coupler. These coupler brackets are formed with upper and lower plates 12 and 14, respectively, pierced at 16 to receive a pivot for inner ends of links 8. The upper plate 12 is pierced and tapped, as at 18, to receive cap screws or bolts 20 extending through base 22. The top plate 12 is also pierced, as at 24, to receive the lower end of a pivot pin 26 extending upwardly and downwardly from base 22. Pivotally mounted on pivot pin 26 is a lever 27 having an arm 28 comprising an outward facing gear segment 29 having teeth 30 adapted to mesh with similar teeth of the adjacent car. Extending inwardly from the gear segment, and rigidly connected thereto, is an arm 32 adapted to be pivotally connected, as at 34, to a link 36 pivotally connected at 38 to a bracket 40 rigid with the car end wall. This bracket 40 may be, and preferably is, formed as part of the bracket 2, previously referred to. The gear segments are held on the pivot pin 26 by means of washer and nut assembly 42.

As shown, in Figs. 3 to 6 inclusive, the lateral motion devices are duplicated on opposite sides of the longitudinal vertical plane through the coupler center line and this is necessary in cases where clearances are very close. Where it is possible to do so the mechanism may be simplified by mounting a single gear segment with the pivot 26 having its axis lying in a longitudinal vertical plane through the center line of the coupler. This modification is shown in Fig. 7, and since the construction of the parts is identical with that previously described, the same reference numerals have been used. In this case the base 22 will be mounted directly on a pad formed on the upper surface of the tight-lock coupler heads.

It will be seen from the preceding description that any lateral motion between the cars cannot occur since such motion is resisted by the rotatively interengaged teeth 30 which in turn are held against movement by links 36 connected directly to the car. When a shock or force tends to move one car laterally with respect to the other, the teeth 30 of the arms 28 will tend to move in opposite directions, relatively considered. However, since each arm 32 is rigidly connected to its adjacent gear segment or arm 28, and through its associated arm 36 to the car end wall bracket 40, the teeth on each segment will be unable to rotate and will oppose relative lateral movement by the teeth on the other segment so that the cars will be held against such movement. When the cars turn, however, the gears will rotate permitting the necessary turning for the cars in rounding curves. This is so because, in the form of the invention illustrated in Fig. 6, for example, as the cars turn with respect to each other, the brackets 40 on one side of the cars are brought closer to each other while the brackets on the other side are moved apart, depending upon the direction of turning. If, for example, the turn is such that the brackets 40 in Fig. 6 are moved towards each other, and since the actual center of rotation of the turning car is a point along the coupler shank inwardly of the car end, it will be seen that as the pivot at 38 of the turning car moves about the center of rotation on the coupler shank, the pivot at 34 will be urged by the link 36 in an annular path, as viewed, about the pivot pin 26. This movement of the pivot 34 of the turning car in turn pivots the rigidly connected arms 32 and 28 about the pin 26 so that the meshing teeth, instead of tending to move in opposite directions, tend to move relatively in the same direction to offer no resistance to relative turning of the cars. The controls will automatically come into meshed engagement upon coupling of the cars and will always be positioned in the proper relation each to the other.

While the invention has been described with particular reference to cars of the low level type it will be obvious that it is not limited to such cars and may be used with any floor level car where it is desirable to limit or control lateral motion between the cars while permitting relative turning and other movements.

What is claimed is:

1. In a railway train comprising two adjacent cars, each car comprising a car body having an end portion, wheel and axle means operatively connected to said car body adjacent and inwardly of said end portion and a coupler pivotally connected to said car body inwardly of said end portion, the couplers of said two cars when interengaged forming a substantially rigid bar, the improvement consisting of means for controlling relative lateral motion between adjacent car end portions and comprising a gear segment pivotally mounted on said coupler of each car, said gear segments facing outwardly of said end portions of the respective cars and interengaging when said couplers interengage, each said segment further having an inwardly extending arm connected thereto, each said car body further having a bracket extending outwardly toward the other of said cars, and each bracket being connected to the inner end of the said inwardly extending arm of the same car.

2. In a railway train the combination of a plurality of cars, wheels operatively connected to said cars adjacent and inwardly of the ends thereof, a coupler on each car and interengaging with the coupler of the adjacent car to form a substantially rigid bar connecting the cars in train and allowing relative turning between the cars and means including a lever pivotally carried by each coupler and a link on each car pivotally connected to the car end and to said lever, said lever comprising a gear segment and the gear segments of adjacent cars interengaging when said couplers of said cars interengage, thereby holding said cars against lateral movement relative to each other.

3. A structure according to claim 2, said coupler having a pivot located in the vertical longitudinal center plane of said coupler and said lever being mounted on said pivot.

4. A structure according to claim 2, each car having one of said levers pivotally mounted on each side of said coupler, and each car further having one of said links extending laterally outwardly from each lever towards the side of said car.

5. In a railway train comprising two adjacent cars, each car comprising a car body having an end portion, wheel and axle means operatively connected to said car body adjacent and inwardly of said end portion and a coupler pivotally connected to said car body inwardly of said end portion, the couplers of said two cars when interengaged forming a substantially rigid bar, the improvement consisting of means for controlling relative lateral motion between adjacent car end portions and comprising a pivot mounted on said coupler of each car, a lever mounted intermediate its ends on said pivot, said lever having an arm extending longitudinally of said car body and outwardly of the end thereof from said pivot and an arm extending longitudinally inwardly from said pivot, the inner end of each inner arm having a link pivotally connected thereto and extending laterally therefrom and pivotally connected to said car end portion, and means comprised by said outwardly extending arms and interengaging when said couplers interengage, said last mentioned means when interengaged restricting each other's motion to equal angular rotation.

6. A structure according to claim 5, said interengaging means of said outward extending arms being gear teeth.

References Cited in the file of this patent

UNITED STATES PATENTS

| | | |
|---|---|---|
| 873,288 | Barth | Dec. 10, 1907 |
| 2,111,676 | Ritchie | Mar. 22, 1938 |